DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 7, 1976

950 O.G. 6

T950,006

METHOD FOR REDUCING NOXIOUS GAS CONTENT OF AUTOMOBILE EXHAUST

Leonard Leibowitz, Chicago, and Martin G. Chasanov, Homewood, Ill., assignors to the United States of America as represented by the United States Energy Research and Development Administration

Filed Nov. 6, 1975, Ser. No. 629,261
Int. Cl.[2] B01D *53/00;* B01K *1/00*
U.S. Cl. 204—177
No Drawing. 13 Pages Specification

The concentration of noxious gases—including $NO_x$—in automobile exhaust is substantially reduced by drying the exhaust and subjecting the exhaust for at least 15 seconds to a low-intensity electric arc. A Telsa coil producing high-voltage, high-frequency damped pulse with the pulses repeating every $1/120$ second is useful for producing this arc. Exposure of the exhaust to a low-intensity, 13 mm. arc for 15 seconds to 2 minutes reduces the concentration of $NO_x$ and other noxious gases whereas exposure to a high-intensity arc increases the concentration of $NO_x$.